United States Patent [19]

Hartzler et al.

[11] 4,017,687

[45] Apr. 12, 1977

[54] DEVICE FOR MINIMIZING INTERCHANNEL CROSSTALK IN HIGH RATE COMMUTATOR MULTIPLEXERS

[75] Inventors: Franklin R. Hartzler, Camarillo; Michael V. Wechsler, Ventura, both of Calif.

[73] Assignee: The United States of America as represented by the Secretary of the Navy, Washington, D.C.

[22] Filed: Nov. 28, 1975

[21] Appl. No.: 635,821

[52] U.S. Cl. .......................... 179/15 A; 179/15 BL
[51] Int. Cl.² ......................................... H04J 3/10
[58] Field of Search ......... 179/15 A, 15 BL, 15 AA

[56] References Cited

UNITED STATES PATENTS

| 3,152,319 | 10/1964 | Gordon | 179/15 A |
| 3,427,475 | 2/1969 | Wilkinson | 179/15 BL |
| 3,581,017 | 5/1971 | Stevens | 179/15 A |
| 3,769,461 | 10/1973 | Lewis | 179/15 A |

*Primary Examiner*—David L. Stewart
*Attorney, Agent, or Firm*—Richard S. Sciascia; Joseph M. St.Amand; William W. Cochran, II

[57] ABSTRACT

A switching system for use in conjunction with a high rate commutator multiplexer which separates the commutator switches into two groups. During alternating off periods, each group is grounded through a switch such that voltage which is built up on the inherent capacitances of the commutator switches is reduced to zero. In this manner, crosstalk is virtually eliminated between channels of the commutator.

7 Claims, 3 Drawing Figures

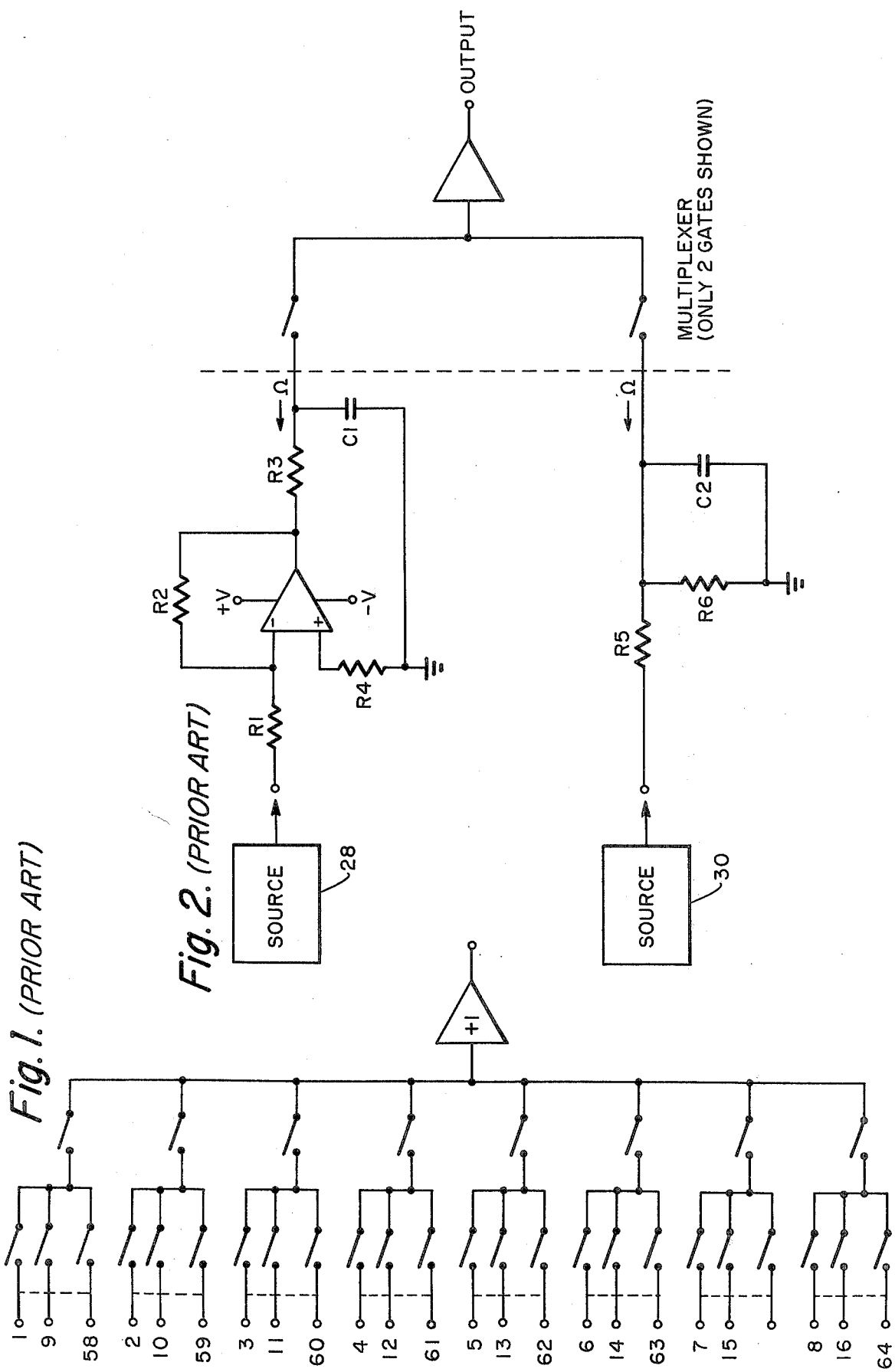

DEVICE FOR MINIMIZING INTERCHANNEL CROSSTALK IN HIGH RATE COMMUTATOR MULTIPLEXERS

BACKGROUND OF THE INVENTION

The present invention pertains generally to commutators and more specifically to a device for minimizing crosstalk between channels of commutator multiplexers. Crosstalk has presented a serious limitation in the use of high impedance sources in conjunction with commutators which operate at a high rate, i.e., 25 khz to 100 khz and higher, due to inherent capacitance in the commutator switches. Since the commutator switches are connected in parallel to a single output, the capacitances of the switches add together to form a larger capacitance which is more capable of storing voltages and thereby increasing crosstalk between channels. Use of higher input impedance sources in conjunction with the commutator switches increases the RC time constant. Voltage stored on the inherent capacitance of the switches will not bleed off as quickly, thereby reflecting crosstalk voltage of a previous channel during the current switching cycle. In a commutator switching device, the actual crosstalk measurement is a function of the commutator input capacitance and the switching rate of the commutator. The commutator switches, as previously stated, have a finite input capacitance which is charged to the input signal level of the channel being sampled at a specific time. If the channel has a level of, for instance, 2.5 V, the inherent capacitance of the switches reflects a 2.5 V charge when the multiplexer switches to the next channel. If the next channel has an impedance of 500 kohms and a voltage level of −2.5 V, the stored +2.5 V level must be discharged through the 500 kohm resistor and recharged to the new −2.5 V level. In a high rate commutator, the inherent capacitance does not have time to fully discharge and subsequently recharge to the new source voltage level. The resulting error in voltage of the channel being sampled, due to previously sampled data, is defined as the interchannel crosstalk.

Existing commutator designs have minimized crosstalk by limiting the input capacitance. A standard approach has been to build at least two tiers of switches, the first tier containing a series of subgroups of the multiplexed channels. For example, in a 64-channel multiplexer, eight separate subgroups have been used, each containing eight channel multiplexers. A series of selection switches are used to connect each of the subgroups to the single output successively. In this manner, any particular signal source reflects the inherent capacitance of the switches within its own subgroup in addition to the capacitance of the series of additional successive switches. For example, in the 64-channel multiplexer any particular channel looks at the inherent capacitance of the eight switches within its group plus the eight successive selection switches, amounting to the inherent capacitance of 16 switches. This system therefore reduces the inherent capacitance of an unaltered system by one-fourth. However, this system adds to the complexity of the switching network in addition to adding additional costs relating to the additional switches required for operation of the system and required switching control means. In addition, the reliability and usefulness of such a system is reduced because of its complexity and implementation. As such, existing commutators on the market have been limited to a maximum input impedance of approximately 10 to 50 kohms because of the interchannel crosstalk.

For these reasons, expensive active signal conditioning networks have been incorporated between the high output impedance source and the commutative switches to reduce the output impedance of the source. The commutative multiplexing system requires that the output impedance of each of the sources be approximately equal. The standard method of matching impedances at the output is to use a series resistor and an RC tank network to ground. However, the Thevenin equivalent of the resistances normally reflects a high output impedance which is incompatible with the commutative switching network. Active signal conditioning networks are therefore required to present a low output impedance. Each of these active signal conditioning networks require expensive operational amplifiers and voltage supplies which greatly increase the overall cost of the system. Their complexity, in addition, introduces a reduced reliability factor in the operation of the system, as well as adding to the overall bulk of the system.

SUMMARY OF THE INVENTION

The present invention overcomes the disadvantages and limitations of the prior art by providing a device for minimizing interchannel crosstalk for high rate commutators. The present system divides the set of commutator switches into two subgroups which alternately connect the subgroups to a single output. The commutative switches within each subgroup are then successively connected to a common output of the subgroups during the time the selection switch for its subgroup is connected to the output. During the off times of the selection switch, a grounding switch connects the subgroup to ground so that the charge built up due to the inherent capacitance of the commutative switches is reduced to zero.

It is therefore an object of the present invention to provide an improved device for minimizing interchannel crosstalk in a high rate commutator multiplexer.

It is also an object of the present invention to provide a device for minimizing crosstalk in a high rate commutator multiplexer which is reliable in operation.

Another object of the present invention is to provide a device for minimizing interchannel crosstalk in a high rate commutator multiplexer which is inexpensive to implement.

Another object of the present invention is to provide a device for minimizing interchannel crosstalk in a high rate commutator multiplexer which is compatible with low cost, passive signal conditioning networks.

Other objects and further scope of applicability of the present invention will become apparent from the detailed description given hereinafter. The detailed description, indicating the preferred embodiment of the invention, is given only by way of illustration as various changes and modifications within the spirit and scope of the invention will become apparent to those skilled in the art from the detailed description. The foregoing abstract of the disclosure is for the purpose of providing a non-legal brief statement to serve as a searching, scanning tool for scientists, engineers, and researchers, and is not intended to limit the scope of the invention as disclosed herein nor is it intended to be used in interpreting or in any way limiting the scope or fair meaning of the appended claims.

BRIEF DESCRIPTION OF THE DRAWINGS

FIG. 1 is a schematic diagram of a prior art 64-channel commutator using an eight by eight tier switching arrangement.

FIG. 2 is a schematic diagram of examples of both active and passive signal conditioning networks utilized in the prior art.

DETAILED DESCRIPTION OF THE PREFERRED EMBODIMENT

Figure 3:
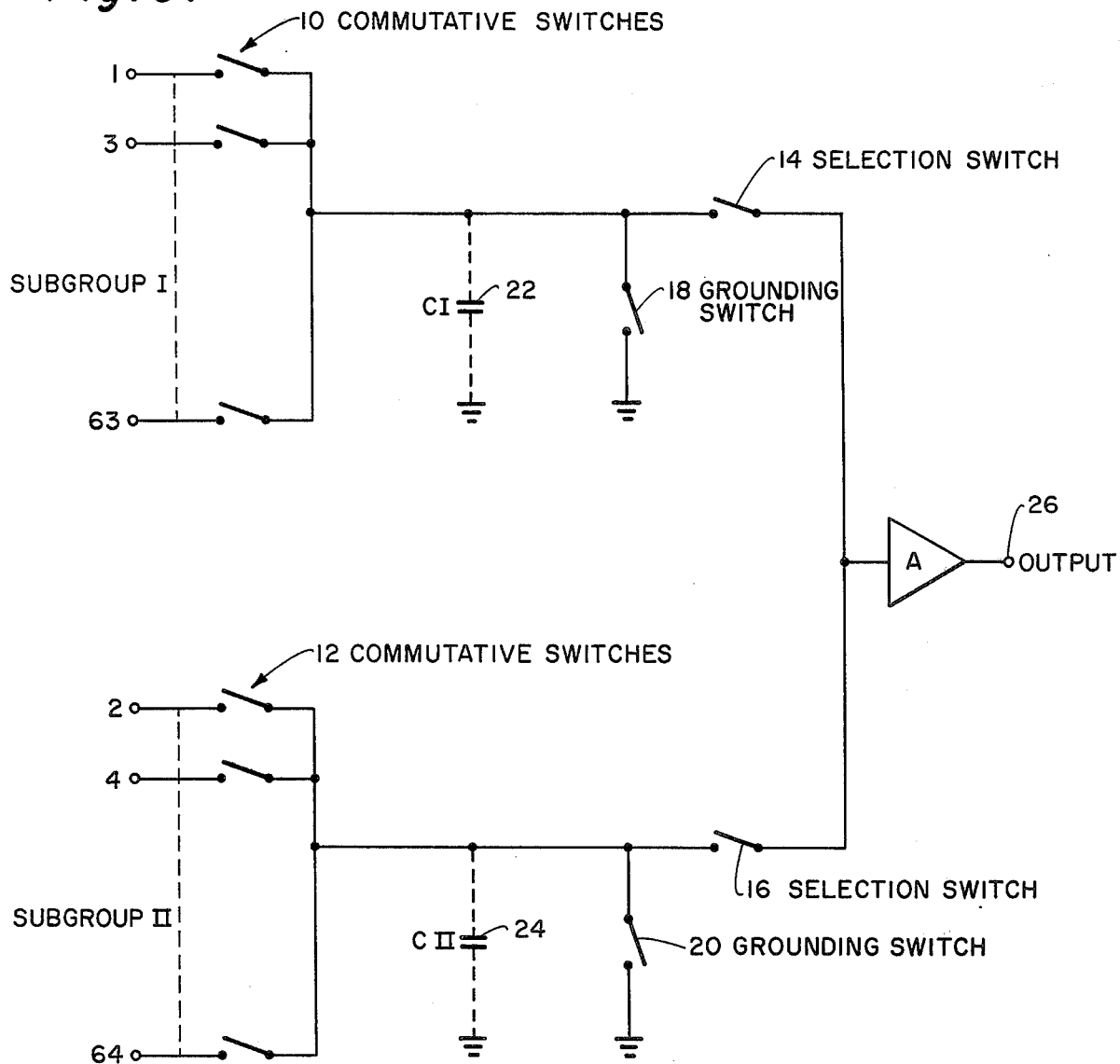
FIG. 3 is a schematic diagram of the preferred embodiment of the invention.

FIG. 1 is a schematic diagram of a prior art tier switching arrangement used to reduce interchannel crosstalk.

The commutative switches are grouped into eight separate subgroups which are connected to the output through a series of selection switches connected in parallel. In operation, the first commutator switch, numbered one, is contacted along with the first selection switch. The inherent capacitance of the switches seen by the first switch is equal to the added capacitances of the eight switches within the subgroup, and the eight selection switches. Without these selection switches, the inherent capacitances would amount to the combined capacitances of all of the 64 switches. In this manner, the tier switching arrangement reduces the inherent capacitance and the interchannel crosstalk by a factor of four.

FIG. 2 is a schematic diagram of examples of prior art active and passive signal conditioning networks. The purpose of each of the signal conditioning networks shown in FIG. 2 is to match the output impedances of source 28 and source 30 before it is applied to the multiplexing circuit. The passive signal conditioning network shown in the lower portion of FIG. 2 is an inexpensive and reliable method of matching impedances. However, the Thevenin's equivalent of the resistive network reflects a very high output impedance which is incompatible with the multiplexing circuit due to the interchannel crosstalk. To overcome these problems, active signal conditioning networks such as the one shown in the upper portion of FIG. 2 have been used which effectively match the impedances of the sources before they are applied to the multiplexing circuit as well as providing a low output impedance. However, these systems are expensive to implement due to the cost of the operational amplifier required for each signal source applied to the multiplexer and its attendant circuitry including its voltage supply sources. These systems have been found to reduce the reliability of the overall system when compared to the simple passive signal conditioning network.

FIG. 3 is a schematic diagram of the preferred embodiment of the invention. The commutative switches of the device of FIG. 3 are broken down into two subgroups; subgroup I and subgroup II. The commutative switches 10 in subgroup I include the odd numbered switches while the even numbered commutative switches 12 are included in subgroup II. Selection switches 14 and 16 connect subgroup I and subgroup II to the output 26, respectively. In operation, switch 1 in subgroup I is activated at the same time selection switch 14 is activated. Subsequently, switch 1 of the commutative switches 10 and selection switch 14 are deactivated and switch 2 in subgroup II and selection switch 16 are activated. In a similar manner, the remaining commutative switches, 3 through 64, are alternatively connected to the output 26. Since the total group of commutative switches is broken down into two subgroups in which the switches are connected in parallel, the resultant inherent capacitance illustrated as $C_I$ is equal to the sum of the inherent capacitance of half of the total number of commutative switches. Within subgroup II, the inherent capacitance is equal to the capacitance of $C_{II}$. This method of alternatively connecting each of the subgroups to an output allows grounding switches 18 and 20 to function to discharge the inherent capacitances of $C_I$ and $C_{II}$ of the commutative switches whenever they are not connected to the output. In this manner, the interchannel crosstalk is reduced to zero by discharging the voltage stored on the inherent capacitance of the commutative switches.

The device of the preferred embodiment therefore eliminates the low impedance requirement for the source outputs, thereby greatly reducing the costs of the commutative multiplexer, since the expensive active conditioning networks are no longer required. The system is capable of operation with extremely high source impedance with a minimum of interchannel crosstalk. Furthermore, the device eliminates much of the complex switching sequences required by the prior art switching arrangements which use numerous subgroups.

Obviously many modifications and variations of the present invention are possible in light of the above teachings. For instance, an external capacitor can be placed across the source such that the inherent capacitance of th commutative switches is charged rapidly each time a new sample is taken. This modification additionally improves the output waveform characteristics. Furthermore, the use of switches to discharge inherent capacitance of commutator switches prior to sampling a new data source can be implemented in any switching circuit configuration to minimize interchannel crosstalk. It is therefore to be understood that within the scope of the appended claims the invention may be practiced otherwise than as specifically described.

What is claimed is:

1. A device for minimizing interchannel crosstalk in a high rate commutator multiplexer comprising:
    a. a first subgroup of commutative switches connected in parallel;
    b. a second subgroup of commutative switches connected in parallel;
    c. first switching means connected to said first subgroup of commutative switches for periodically connecting said first subgroup to an output in accordance with a first predetermined switching pattern;
    d. second switching means connected to said second subgroup of commutative switches for periodically connecting said second subgroup to said output in accordance with a second predetermined switching pattern;
    e. means for periodically grounding said first subgroup of commutative switches in accordance with said second predetermined switching pattern;
    f. means for periodically grounding said second subgroup of commutative switches in accordance with said first predetermined switching pattern;
    g. wherein said first subgroup and said second subgroup of commutative switches are alternatively grounded to discharge voltage accumulated due to inherent capacitance in said commutative switches, thereby minimizing interchannel crosstalk.

2. The device of claim 1 wherein said means for periodically grounding said first subgroup and said second subgroup comprises a semiconductor switch.

3. The device of claim 1 wherein signal conditioning networks connected to said commutative switches comprise an resistive network having a high output impedance with a minimum of crosstalk between channels.

4. The device of claim 3 wherein said means for periodically grounding said first subgroup and said second subgroup comprises a semiconductor switch.

5. A device for reducing crosstalk between channels of a rapid commutator multiplexer commutator comprising:

a. means for alternatively switching two subgroups of commutative switches to a single output;

b. means for grounding said commutative switches whenever said commutative switches are not connected to said output to provide a means for discharging inherent capacitance in said commutative switches and thereby reduce crosstalk between channels.

6. The device of claim 5 wherein signal conditioning networks connected to said commutative switches comprise an resistive network having a high output impedance with a minimum of crosstalk between channels.

7. The device of claim 5 wherein said means for grounding comprises a semiconductor switch.

* * * * *